United States Patent [19]

Daugherty

[11] 4,413,552
[45] Nov. 8, 1983

[54] COFFEE MAKING MACHINE

[75] Inventor: Donald L. Daugherty

[73] Assignee: Bunn-O-Matic Corporation, Springfield, Ill.

[21] Appl. No.: 334,579

[22] Filed: Dec. 28, 1981

[51] Int. Cl.³ ............................................. A47J 31/00
[52] U.S. Cl. ...................................................... 99/295
[58] Field of Search .................. 99/280, 281, 282, 283, 99/295, 300, 304, 306, 307, 290

[56] References Cited

U.S. PATENT DOCUMENTS

| 3,385,201 | 5/1968 | Martin | 99/295 |
| 3,443,508 | 5/1969 | Reynolds | 99/282 |
| 4,222,320 | 9/1980 | Castleberry | 99/295 |
| 4,354,427 | 10/1982 | Filipowicz | 99/295 |

Primary Examiner—Robert W. Jenkins
Attorney, Agent, or Firm—Larson and Taylor

[57] ABSTRACT

A cold water pour-in beverage brewer having a generally C-shaped body with the upper and lower leg portions extending forwardly from an upright interconnecting leg portion. The body houses an integral inverted L-shaped receptacle formed by an elongated shallow cold water basin from adjacent the bottom of one end of which a relatively deep hot water tank depends. The cold water basin sets in the top of the upper leg portion of the brewer body and has an out-turned flange on its top edge which rests for support on an in-turned flange on the edge of the top opening in the body. A cover fits over and completely covers the cold water basin and rests thereon. The cover has a pour-in opening adjacent the front of the brewer. A pair of top beaker warmers are supported in tandem on a heater unit mounted on the cover rearwardly of the pour-in opening. The hot water tank is housed mainly within the upright leg portion of the body. A removable brewer funnel is supported underneath upper leg portion so that beverage from the funnel falls into a beaker supported on a heater located on the lower leg portion. A removable baffle plate closes the opening between the cold water basin and the hot water tank so to provide ready access to the interior of the hot water tank for cleaning.

6 Claims, 10 Drawing Figures

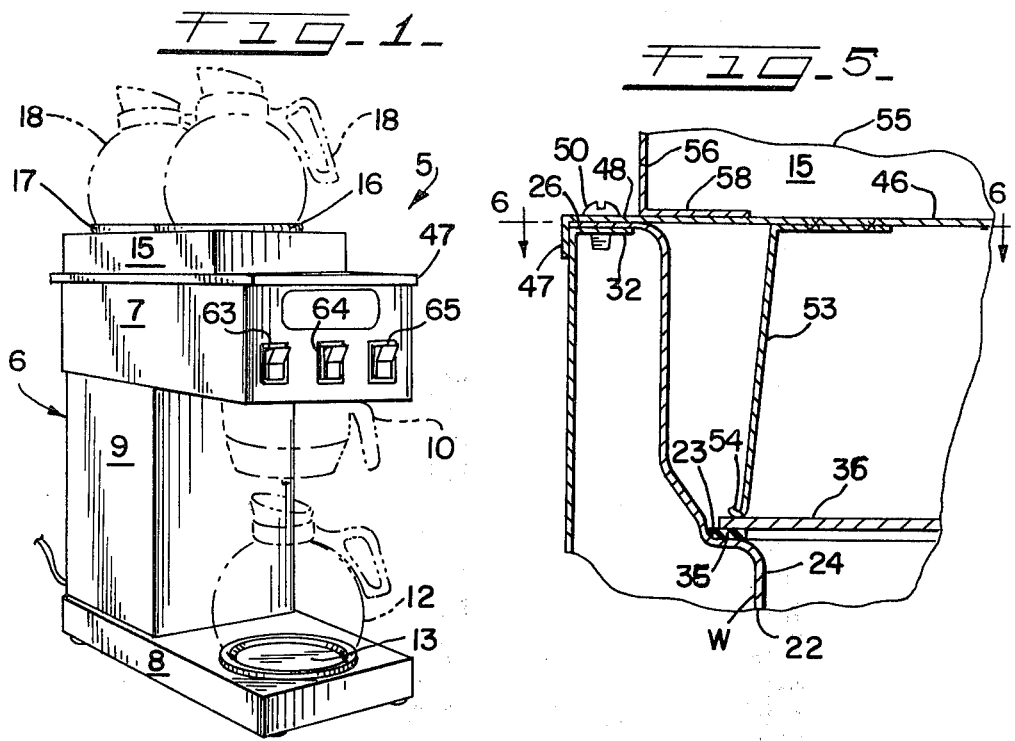
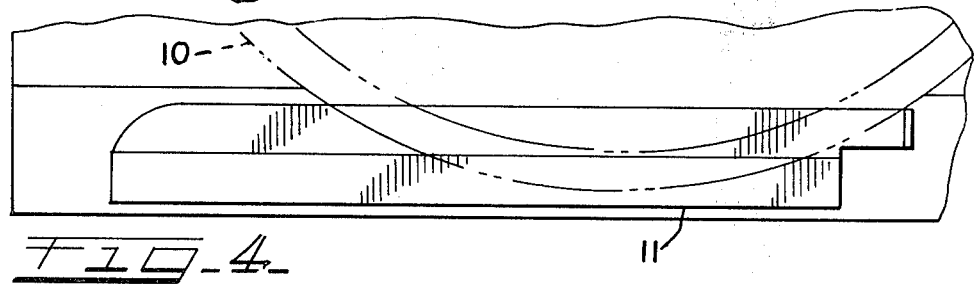
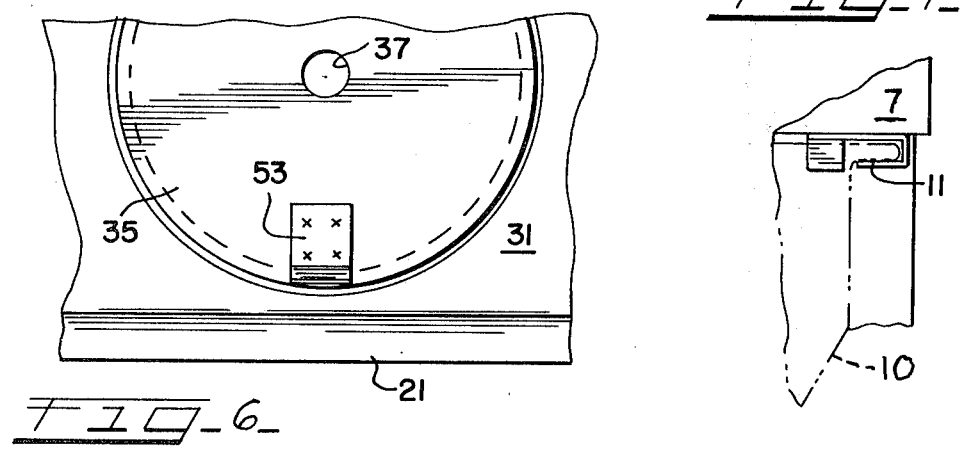

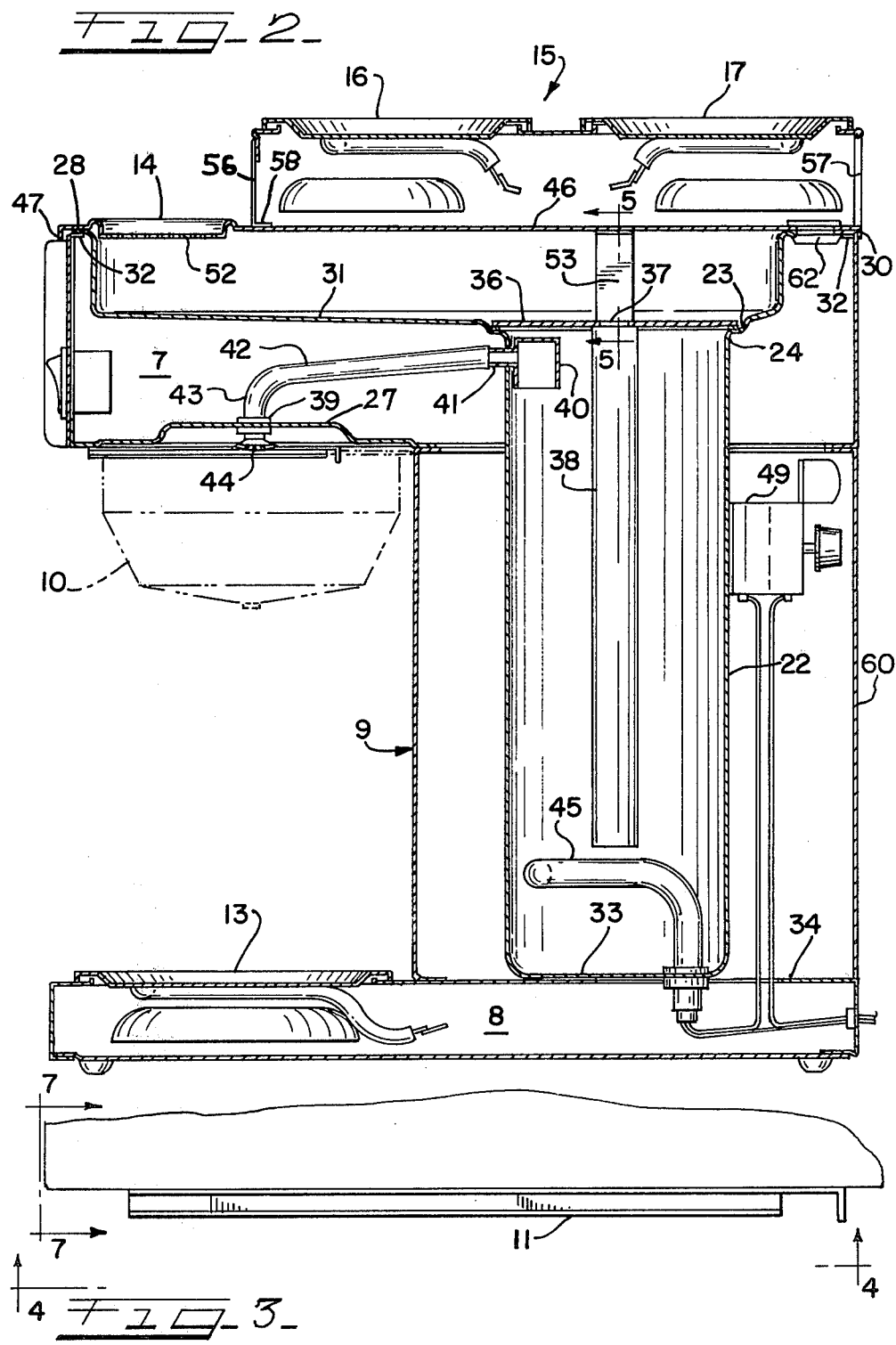

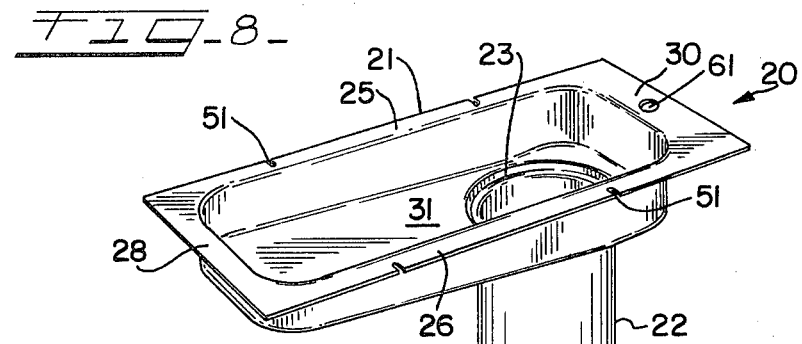
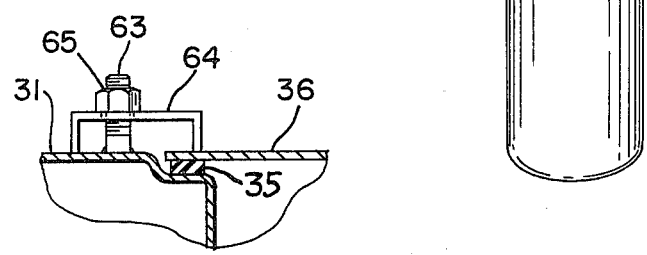
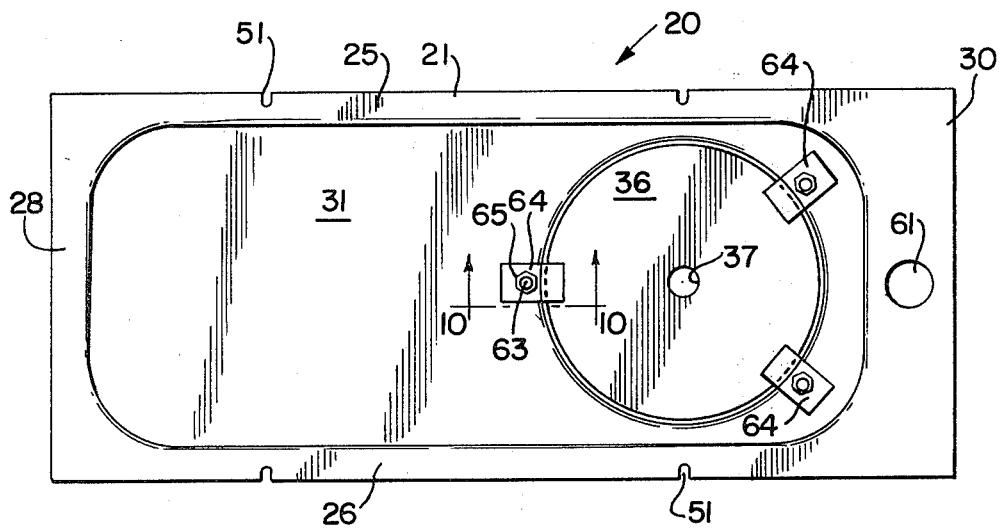

COFFEE MAKING MACHINE

This invention relates generally to innovations and improvements in beverage brewers of the cold water, pour-in type. These novel beverage brewers are relatively narrow and have the pour-in opening in the top adjacent the front end with two top warmers behind the pour-in opening in addition to the usual bottom warmer which supports a beaker or carafe under the brewer funnel. The brewer is capable of brewing a two-quart batch of coffee or other beverage and two quarts of cold water can be rapidly dumped into the pour-in opening.

Cold water pour-in beverage makers of known type in which a supply of hot water is maintained until displaced by cold water, are in extensive use, primarily in homes and small offices. For example, cold water, pour-in beverage makers are disclosed in the following patents: Martin U.S. Pat. No, 3,220,334, Lorang U.S. Pat. No. 3,354,810, Martin U.S. Pat. No. 3,450,024, Reynolds U.S. Pat. No. 3,479,949, Martin U.S. Pat. No. 3,494,276, Bloomfield et al U.S. Pat. No. 3,513,767, Martin U.S. Pat. No. 3,691,932, Martin U.S. Pat. No. 3,736,155 and Petry U.S. Pat. No. 4,192,227. In restaurants and larger offices, the beverage brewers are generally of the automatic type in which batches of cold water are introduced from a cold water supply line discharging into a cold water basin under the control of an electrically operated valve. Beverage brewers of the automatic type are disclosed in the folowing patents: Bunn U.S. Pat. No. 3,100,434, Martin U.S. Pat. No. 3,691,933, Martin U.S. Pat. No. 3,793,934, Martin U.S. Pat. No. 4,094,233 and Bunn U.S. Pat. No. 25,663.

The cold water, pour-in type of beverage brewer offers several important advantages over the automatic type. Two of the most important being that they are portable and do not require a plumbing connection. On the other hand, the pour-in type beverage brewers tend to have less capacity that the automatics and, in at least some models, a full batch of cold water cannot be rapidly dumped into the pour-in opening.

The object of the present invention, generally stated, is a provision of a cold water, pour-in type beverage brewer characterized by having, if desired, a capacity to maintain at least two quarts of water in heated condition ready for use in brewing with provision for two quarts of cold water to be rapidly dumped through a pour-in opening.

A further object of the invention is the provision of a cold water, pour-in beverage maker of up to two quarts capacity and characterized in being relatively narrow from side to side so as to take up a small amount of counter space from left to right and in having a readily accessible pour-in opening adjacent the front end, a pair of beaker warmers mounted on a top heater unit rearwardly of the pour-in opening.

The increased capacity (e.g. up to two quarts of cold water), rapid fill and rapid beverage production features permit the cold water, pour-in beverage brewers of my invention to be utilized in a number of places where currently available cold water, pour-in type beverage or coffee brewers are not considered to have adequate capacity.

A further object of the invention is the provision of a cold water, pour-in beverage brewer characterized by having an elongated, shallow cold water basin from the bottom of the front end of which an integral relatively deep hot water tank is supported at right angles. The shallow cold water basin is housed in the upper portion of the top leg of a generally C-shaped brewer body while the hot water tank is housed primarily in the vertical leg of the brewer body.

Still another important object of the invention is the provision of a cold water, pour-in beverage brewer of the type having a generally C-shaped brewer body which houses therewithin an integrally formed cold water basin-hot water tank combination having an inverted L-shape with a shallow elongated cold water basin being removably supported from the upper edge of a top opening in the brewer body, with a removable cover on the body covering the top of the basin as well as the top opening in the brewer body, and with a dry heater compartment mounted on the top of the cover and carrying two warmer plates in tandem behind a pour-in opening in the front end of the cover. The cover is readily removable so as to provide easy access to the interiors of the cold water basin and the hot water tank for cleaning and other purposes.

Certain other objects of the invention will be apparent from the following detailed description of a presently preferred embodiment of the invention taken in connection with the accompanying drawings wherein:

FIG. 1 is a perspective view of a cold water, pourin coffee brewer forming one embodiment of the present invention and wherein three coffee beakers of carafes are shown in broken outline along with a removable brewer funnel. FIG. 2 is a longitudinal vertical sectional view of the brewer shown in FIG. 1, certain parts being shown in elevation.

FIG. 3 is a fragmentary side elevational detail view on enlarged scale showing the inside of one of the guide rails for the removable brewer funnel.

FIG. 4 is a fragmentary detail bottom plan view of the guide rail construction shown in FIG. 3. FIG. 5 is an enlarged fragmentary detail sectional view taken on line 5—5 of FIG. 2.

FIG. 6 is a fragmentary top plan view taken on line 6—6 of FIG. 5.

FIG. 7 is a fragmentary detail view taken on line 7—7 of FIG. 3. FIG. 8 is a perspective view of the integral, inverted L-shaped, combination elongated shallow cold water basin and relatively deep hot water tank housed in the brewer shown in FIGS. 1 and 2.

FIG. 9 is a top plan view of the integral cold water basin-hot water tank shown in FIG. 8 with the addition of a lid disc in place over the hot water tank and held down by three clamps.

FIG. 10 is a detail sectional view on line 10—10 of FIG. 9.

Referring to FIG. 1, a cold water, pour-in coffee brewer is indicated generally at 5 which has a generally C-shaped body 6 which includes an upper leg portion 7, a lower leg portion 8, and an interconnecting upright leg portion 9. The brewer body 6 is fabricated in known manner, desirably from stainless steel sheet, but it may be fabricated from other metals or from known plastics having suitable strength and durability. A brewer funnel of known type indicated at 10 is removably supported in known manner by guide rails 11—11 underneath the upper leg portion 7. A coffee breaker or carafe 12 is removably supported on the leg 8 underneath the funnel 10 on a heated warming plate or disc 13 mounted on the lower leg portion 8.

A cold water, pour-in opening 14 is located on the top front (FIG. 2) of the upper leg portion 7. Rearwardly thereof, a top warmer unit 15 is mounted which includes a pair of warming plates 16 and 17 on which two additional beakers or carafes 18 may be mounted.

The C-shaped brewer body 6 houses an integral, inverted L-shaped, combination elongated cold water basin and relatively deep hot water tank indicated generally at 20 in FIGS. 8 and 9. The elongated cold water basin 21 is desirably die-pressed in known manner from stainless steel sheet and the relatively deep hot water tank 22 is welded to a bottom opening formed adjacent the deep end of the basin 21. The opening in the bottom of the basin 21 is formed in such a manner as to have a circumferential depression or recess 23 (FIGS. 2 and 8) with a circumferential collar 24 (FIG. 5) integrally formed on the bottom of the depression 23. The upper circumferential edge of the deep tank 22 is welded (W FIG. 5) to the bottom edge of the collar 24 so as to make the basin and tank 22 an integral inverted L-shaped receptacle or container. The tank 22 is preferably fabricated from stainless steel sheet in known manner.

The upper edge of the shallow cold water pan or basin 21 is provided with a continuous out-turned, horizontal flange comprising side portions 25 and 26 and end portions 28 and 30.

It will be seen from FIG. 2 that the bottom 31 of the basin 21 slopes toward the bottom recess 23 so that cold water poured into the basin 21 will flow and drain into the tank 22.

The manner in which the unit 20 is mounted and supported within the housing or body 6 of the brewer is shown in FIGS. 2 and 5. Referring to FIG. 2, it will be noted that the upper leg portion 7 of the body 6 has an in-turned horizontal flange 32 formed around the upper edge thereof. The out-turned flange on the upper edge of the basin 21 is dimensioned so as to fit over and rest flatwise upon the in-turned flange 32.

The height of the deep tank 22 is so dimensioned that the bottom 33 thereof is spaced at least slightly above the top wall 34 of the lower leg portion 8 so that the lateral flange on the basin 21 will rest on the in-turned flange 32.

In a brewer 5 capable of making two-quart batches of coffee, the tank 22 can have, by way of illustrative example, an inside diameter of 5 inches and a depth of 14 inches giving it a capacity of 275 cubic inches (i.e. 4.76 fluid quarts). The capacity of the shallow basin 24 suitable for a hot water tank 22 of such capacity is 155 cubic inches (i.e. 2.68 fluid quarts) with the interior of the basin having a length of 15-¼ inches, a width of 6-¼ inches and a depth ranging from 1-¾ to 1-½ inches.

The circular opening communicating between the bottom 31 of the basin 21 and the top of the tank 22 is closed by a disc or baffle 36 which rests on a ring gasket 35 (FIG. 5) seated in the recess 23. A central opening 37 is provided in the disc 36 which communicates with the upper end of a vertical cold water tube 38 (FIG. 2), the upper end of which is welded or otherwise suitably joined to the underside of the disc 35. The bottom end of the cold water tube 38 terminates adjacent the bottom 33 of the tank 22 so that as cold water flows downwardly through the tube 38, it is discharged in the lower portion of the tank 22 and thereby displaces upwardly the hot water contents in the tank 22. This manner of operation is well-known in connection with brewers of the cold water, pour-in type.

An inverted siphon cup 40 is positioned adjacent the top of the tank 22 and the side thereof facing the removable brewer funnel 10. The cup 40 is carried by the inner end of a nipple 41 which projects in fluid-tight relationship through a suitable opening in the wall of the tank 22. The outer end of the nipple 41 connects with a downwardly slanted tube 42 having a down-turned outer or distal end 43 on the lower end of which a hot water spray head 44 is fastened in known manner. The end 43 passes through the spray head panel 27 and secured thereto by a two-part fastener 39 of known type.

Water within the tank 22 is heated in known manner by a heating element 45 that may take the form of a Kelrod element or other known electrically energized heating element.

The top of the basin 21 is covered and enclosed by a cover member 46 which forms the top of the upper portion 7 of the C-shaped body 6. This cover 46 is formed with a downwardly extending flange 47 so as to fit over the upper edge of the vertical side walls forming the upper leg portion 7. The inter-fitting relationship between the in-turned flange 32 on the vertical sidewalls of the upper leg portion 7, the out-turned flange on the cold water basin 21 (25, 26, 28 and 30) and the outer margin 48 and down-turned flange 47 on the cover 46 is well-shown in FIG. 5. This inter-fitting relationship of flange members forms a compact sandwich and peripheral top seal which may be readily secured together by a plurality of screws, one of which is indicated at 50 in FIG. 5. Usually four such screws will be adequate and notches 51—51 are preferably provided therefor in the flanges 25 and 26 as shown in FIG. 8.

The cold water, pour-in opening 14 is formed in the cover 46 adjacent the front of the brewer 5 and preferably is provided with a screen 52 (FIG. 2) so as to prevent foreign objects from entering the enclosed basin 21. A cover of known type (not shown) may be provided for the screened opening 14.

The cover 46 completely encloses the cold water basin 21 and serves as a floor support for the upper and top heater unit 15.

The vertical sidewalls 55—55, and front and rear end walls 56 and 57, of the heater unit 15, are preferably provided with in-turned flanges such as flange 58 on the front end wall 56 whereby these in-turned flanges support the heater unit on the top of the cover 46. The warmer units 16 and 17 are mounted in a top wall of the heater unit 15 in known manner.

Preferably, the rear wall 57 of the heater unit 15 is made so as to be a removable panel, and likewise, the rear wall 60 of the vertical leg portion 9 is preferably made as a removable panel, whereby convenient access may readily be had to the interiors of the heater unit 15 and of the body 6 for such servicing as may be required.

It will be understood that suitable electrical wiring and controls, including a thermostatic control 49 for the heater element 45, will be provided in known manner, the same not forming any part of the present invention. The electrical conductors leading to the top warmers 16 and 17 are arranged to pass through an opening in the cover 46 which registers with an aperture 61 (FIG. 8) in the flange 30 on a basin 21. These registering openings are preferably provided with a resilient grommet 62 (FIG. 2) and the conductors for the heater 16 and 17 can pass through this grommet.

Suitable electrical switches for controlling the water heating element 45 in the tank 22, the bottom warmer 13 and the top warmers 16 and 17 are indicated at 63, 64 and 65 in FIG. 1.

The operation of the brewer 5 will be readily understood since it generally parallels the operation of known cold water, pour-in type beverage brewers. In putting brewer 5 into operation, sufficient cold water is dumped into the basin 21 so as to completely fill the hot water tank 22. The fact that the tank is filled will be known when water commences to siphon out through the side tube 42 and discharge through the spray head 44. When the hot water tank is thus filled, the heating element 45 may be energized and, thereafter, the warmers 13, 16 and 17 likewise energized as needed. Once the cold water contents of the tank 22 have had an opportunity to come to the desired elevated temperature, a filter with the proper amount of ground coffee may be placed in the brewer funnel 10 and inserted into place on the underside of the top leg portion 7 so as to be supported beneath the spray head 44 on the in-turned rails 11—11 mounted on the underside of the leg portion 7.

Assuming that a two-quart batch of coffee is to be brewed, a pitcher containing two quarts of cold water is rapidly dumped into the basin 21 through the opening 14. The cold water will immediately start to flow downwardly through the cold water tube 38 at a fast enough rate so that the basin 21 will not overflow even with fast dumping of the two quarts of cold water through the opening 14. The entrance of the cold water into the bottom of the hot water tank 22 is at such a rate that it does not mix to a substantial extent with the hot water therein, but rather, the in-coming cold water displaces the hot water upwardly so that it commences to flow out through the side tube 42. Once this flow has started, it will continue due to the siphoning action until the water level in the tank 22 drops below and exposes the bottom of the inverted siphon cup 40. As is well-known, hot water sprays from the spray head 44 onto the ground coffee in the brewing funnel 10 and the coffee beverage forms in the funnel and discharges through the bottom opening of the funnel 10 into the carafe or beaker 12 setting on the warmer plate 13.

It will be seen that up to three batches or carafes of coffee may be prepared and maintained at one time on the brewer 5 by using the three warmers 13, 16 and 17.

It will also be seen that the interior of the hot water tank 22 can be readily reached for cleaning by simply removing the cover 46 and lifting the cover together with the heater unit 15 from the upper leg portion 7. Since periodic cleaning or servicing of the interior of the heater tank is normally required, this ready access is a highly desirable feature.

The inverted L-shaped configuration of the combination cold water basin 21 and deep hot water tank 22 allows the brewer 5 to have a relatively narrow profile from left to right so that it takes up only a small space from one side to the other on a counter top or table. Generally, counter space is at a premium and often limited or restricted. Accordingly, this narrow configuration is highly desirable.

In FIGS. 9 and 10, an alternate means for clamping the hot water tank lid 36 is shown which may be used in place of, or in conjunction with, the hold-down legs 53 (FIGS. 2 and 5). This alternate means comprises three upstanding studs 63—63 welded to the floor 31 of the cold water basin around the depression 23 therein. Inverted U-shaped clamp members fit loosely over the threaded ends of the studs 63 and nuts 65—65 are provided for tightening down the clamps 64 on the top of the disc 36 thereby compressing the ring gasket 35 to the desired degree. It will be seen that by loosening the nuts 65 the clamps 64 may be rotated or removed so that the lid 36 may be lifted.

What is claimed is:

1. In a cold water, pour-in beverage brewer, comprising: a generally C-shaped body providing upper and lower leg portions interconnected by an upright leg portion; means for supporting a removable brewer funnel underneath the upper leg portion; heater means on the lower leg portion for heating and supporting a beaker under said brewer funnel; a shallow cold water basin housed within said upper leg portion; and a deep hot water tank housed mainly within said upright leg portion; the improvement wherein said cold water basin and said hot water tank are integral and constitute an inverted L-shaped receptacle, the bottom of said cold water basin having an opening that mates with the opening at the top of said hot water tank, a plate closing off said mating openings, said plate having a drain opening therein, and a cold water tube depending from the underside of said plate with the upper end thereof in communication with said drain opening.

2. In a cold water, pour-in beverage brewer, including: a generally C-shaped body providing upper and lower leg portions interconnected by an upright leg portion; means for supporting a removable brewer funnel underneath the upper leg portion; heater means on the lower leg portion for heating and supporting a beaker under said brewer funnel; an elongated shallow cold water basin housed within said upper leg portion; and a deep hot water tank depending from said basin and housed mainly within said upright leg portion; the improvements wherein said cold water basin and said hot water tank constitute an integral inverted L-shaped receptacle, the bottom of said cold water basin having an opening that mates with the opening at the top of said hot water tank, a plate closing off said mating openings, said plate having a drain opening therein, a cold water tube depending from the underside of said plate with the upper end thereof in communication with said drain opening; said upper leg portion has a top opening and includes a removable cover therefor which also covers said basin, and said cold water basin has means on the top edge for removably supporting said basin on the top edge of said top opening.

3. In a cold water, pour-in beverage brewer, including: a generally C-shaped body providing upper and lower leg portions interconnected by an upright leg portion; means for supporting a removable brewer funnel underneath the upper leg portion; heater means on the lower leg portion for heating and supporting a beaker under said brewer funnel; an elongated shallow cold water basin housed within said upper leg portion; and, a deep hot water tank depending from adjacent one end of said basin and housed mainly within said upright leg portion; said cold water basin and said hot water tank together constituting an integral inverted L-shaped receptacle, the bottom of said cold water basin having an opening that mates with the opening at the top of said hot water tank, a plate closing off said mating openings, said plate having a drain opening therein, a cold water tube depending from the underside of said plate with the upper end thereof in communication with said drain opening; said upper leg portion including a removable cover over a top opening therein; a horizontal flange on at least a portion of the top edge of said top opening; said cold water basin including an out-turned horizontal flange on at least a portion of its top edge which rests flatwise on said first-mentioned horizontal flange on said upper leg portion; and said cover having a cold water, pour-in opening and resting on said second-mentioned flange and covering said basin.

4. The beverage brewer called for in claim 3 wherein said first-mentioned horizontal flange is in-turned and at least substantially continuous, said second-mentioned out-turned horizontal flange is substantially continuous, and the horizontal outer margin of said removable cover rests flatwise on said second-mentioned horizontal flange, said first-mentioned horizontal flange, said second-mentioned horizontal flange, and said horizontal outer margin forming a compact three-layer sandwich and top seal, and removable fastener means for tightening said sandwich and securing said seal.

5. In the beverage brewer called for in claim 3 an enclosed heater unit mounted on said removable cover and including at least one warmer for supporting and heating a beaker, said removable cover providing a barrier between each warmer and the interior of said cold water basin.

6. In a cold water, pour-in beverage brewer, including: a generally C-shaped body providing upper and lower leg portions interconnected by an upright leg portion; means for supporting a removable brewer funnel underneath the upper leg portion; heater means on the lower leg portion for heating and supporting a beaker under said brewer funnel; an elongated shallow cold water basin housed within said upper leg portion; and, a deep hot water tank depending from adjacent one end of said basin and housed mainly within said upright leg portion; said cold water basin and said hot water tank together constituting an integral inverted L-shaped receptacle; said upper leg portion including a removable cover over a top opening therein; a horizontal flange on at least a portion of the top edge of said top opening; said cold water basin including an out-turned horizontal flange on at least a portion of its top edge which rests flatwise on said first-mentioned horizontal flange on said upper leg portion; said cover having a cold water, pour-in opening and resting on said second-mentioned flange and covering said basin; and wherein the opening between said shallow cold water basin and said deep hot water tank is closed by a removable plate having an aperture therein and a cold water tube communicating with said aperture depends from said plate, the relative capacities of said basin and hot water tank and the sizes of said aperture and cold water tube being such that a volume of cold water equal to the brewing capacity of said brewer may be instantaneously dumped into said basin without overflowing.

* * * * *